United States Patent
Kindell et al.

[11] Patent Number: 5,992,435
[45] Date of Patent: Nov. 30, 1999

[54] STAKE ASSEMBLY

[75] Inventors: Gary R. Kindell; Sharon D. Kindell, both of Ripley, Okla.

[73] Assignee: BS&B Safety Systems, Inc., Tulsa, Okla.

[21] Appl. No.: 08/957,720

[22] Filed: Oct. 24, 1997

[51] Int. Cl.[6] .............................. E04H 15/62; A01K 1/04
[52] U.S. Cl. ........................... 135/118; 52/155; 119/781; 119/791; 135/120.4
[58] Field of Search ............................... 135/118, 120.4; 52/154, 155, 156, 165; 119/789, 786, 781, 791; 43/15

[56] References Cited

U.S. PATENT DOCUMENTS

| | | |
|---|---|---|
| 289,033 | 11/1883 | Shattuck . |
| 302,374 | 7/1884 | Baker . |
| 429,111 | 6/1890 | Bailey . |
| 695,427 | 3/1902 | Davis . |
| 1,579,294 | 4/1926 | Fisk ...................................... 119/786 X |
| 1,700,224 | 1/1929 | Hendersen ............................... 119/786 |
| 1,730,176 | 10/1929 | Thrasher et al. . |
| 2,507,383 | 5/1950 | Schiel et al. ......................... 119/781 X |
| 2,713,327 | 7/1955 | West .................................... 119/789 X |
| 2,790,419 | 4/1957 | Sullivan . |
| 2,952,024 | 9/1960 | Bartolucci ......................... 135/120.4 X |
| 3,189,004 | 6/1965 | Sinclair . |
| 3,279,133 | 10/1966 | Korte ..................................... 52/155 X |
| 3,658,037 | 4/1972 | Hunter ................................ 119/781 X |
| 3,952,878 | 4/1976 | Gorham ................................. 52/155 X |
| 4,471,553 | 9/1984 | Copeland .................................... 43/15 |
| 4,750,508 | 6/1988 | Tatoian ................................ 135/118 X |
| 5,542,679 | 8/1996 | Caso ................................... 108/150 X |

*Primary Examiner*—Carl D. Friedman
*Assistant Examiner*—Winnie S. Yip
*Attorney, Agent, or Firm*—Gardere & Wynne, L.L.P.; Lawrence R. Watson

[57] ABSTRACT

A stake assembly includes a spike having a first end and a second end defining a longitudinal axis of the stake. A flange is connected at the second end of the spike and extends laterally therefrom, the upper surface of the flange forming the axially and extremity of the second end of the spike. A receptacle is recessed axially into the flange and second end of the spike. A resilient fastening member, such as a coiled spring, has a first end connected in the receptacle between the flange and the first end of the spike and a second end extending out of the receptacle beyond the upper surface of the flange. A tether or leash may be fastened to the second end of the resilient fastening member.

15 Claims, 3 Drawing Sheets

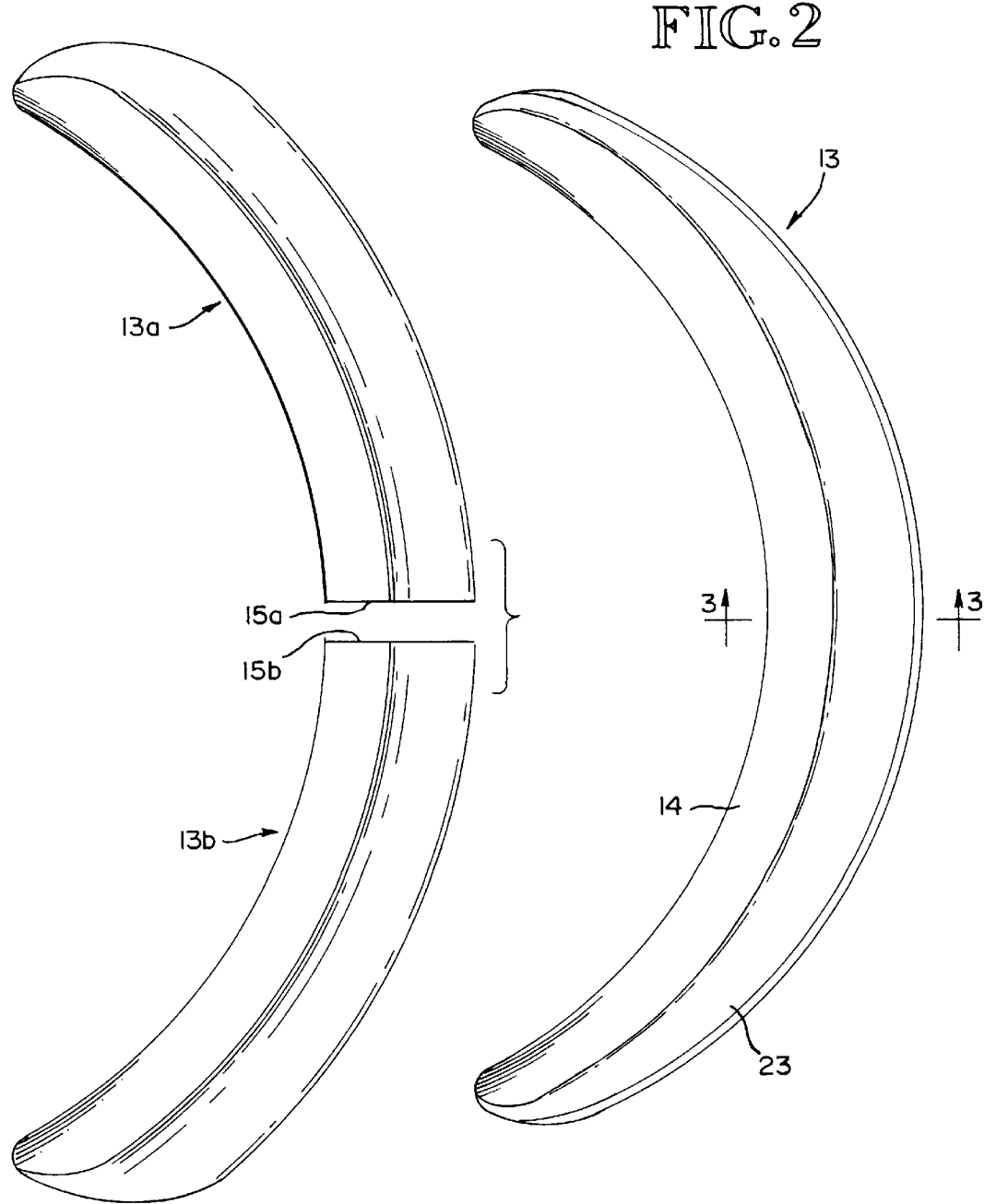

STAKE ASSEMBLY

BACKGROUND OF THE INVENTION

This invention relates to stake assemblies and devices, and more particularly, but not by way of limitation, to a stake assembly which has no rigid structure extending obstructively above ground level.

The use of various types of stakes and tethering devices to restrain animals, tents, boundary wires and lines, and the like, are known. Generally, such devices have included a rigid post which is driven or screwed into the ground, or otherwise attached to the ground, with a rigid end thereof protruding above the ground. The animal or object to be restrained is tethered to the protruding end of the post. The protruding end of the rigid post creates a safety hazard in that it may be stepped on, tripped over, or fallen onto, thereby causing injury; and also causes operational problems, particularly when used to restrain an animal, such as a dog, in that the tether connecting the animal to the protruding end wraps around the protruding end as the animal circumnavigates the post until the freedom of the animal is unnecessarily and perhaps dangerously restrained.

There is a need for a stake assembly which may be used to restrain animal or object and which does not obstructively protrude above ground level; which resiliently restrains animal or object; and which may be easily and quickly installed and removed from the ground.

SUMMARY OF THE INVENTION

The present invention is contemplated to overcome the foregoing deficiencies and meet the above-described needs. In accomplishing this, the present invention provides a novel and improved stake assembly.

The stake assembly includes a spike having a first end and a second end defining a longitudinal axis of the stake assembly. A flange is connected at the second end of the spike and extends laterally therefrom. The flange has a lower surface facing the first end of the spike and an upper surface forming the axial extremity of the second end of the spike. A receptacle extends axially into the flange towards the first end of the spike. A resilient fastening member has a first end connected in the receptacle between the lower surface of the flange and the first end of the spike, and a second end extending out of the receptacle beyond the upper surface of the flange. The preferred spike is a hollow conduit, such as a pipe, and the receptacle is formed by the hollow second end of the conduit.

It is an advantage of the present invention to provide a stake assembly which is safe and inexpensive.

It is an advantage of the present invention to provide a stake assembly which has no rigid structure extending obstructively above the surface of the ground.

It is an advantage of the present invention to provide a stake assembly in which the only structure extending significantly above the surface of the ground is a resilient fastening member which has insufficient resistance to both lateral forces and axially compressive forces to injure a human being that walks into or falls onto the stake assembly.

It is an advantage of the present invention to provide such a stake assembly which is easily seen and located.

It is an advantage of the present invention to provide such a stake assembly that is non-entangling when an animal or pet is tethered to the stake assembly in that the tether will pull over and off of the resilient fastening member rather than wrapping around it as the animal moves around the stake assembly.

It is an advantage of the present invention to provide such a stake assembly that signals an animal tethered to the stake assembly when the animal approaches the length of its tether.

It is an advantage of the present invention to provide such a stake assembly that does not bring the animal to an abrupt stop when the animal reaches the limit of a tether fastened to the stake assembly.

It is an advantage of the present invention to provide such a stake assembly that is easily embedded into and removed from various soil conditions.

It is an advantage of the present invention to provide such a stake assembly that is easily and inexpensively transported from one location to another.

BRIEF DESCRIPTION OF THE DRAWINGS

The present invention will be better understood by reference to the examples of the following drawings.

DETAILED DESCRIPTION OF THE PREFERRED EMBODIMENTS

Figure 1:
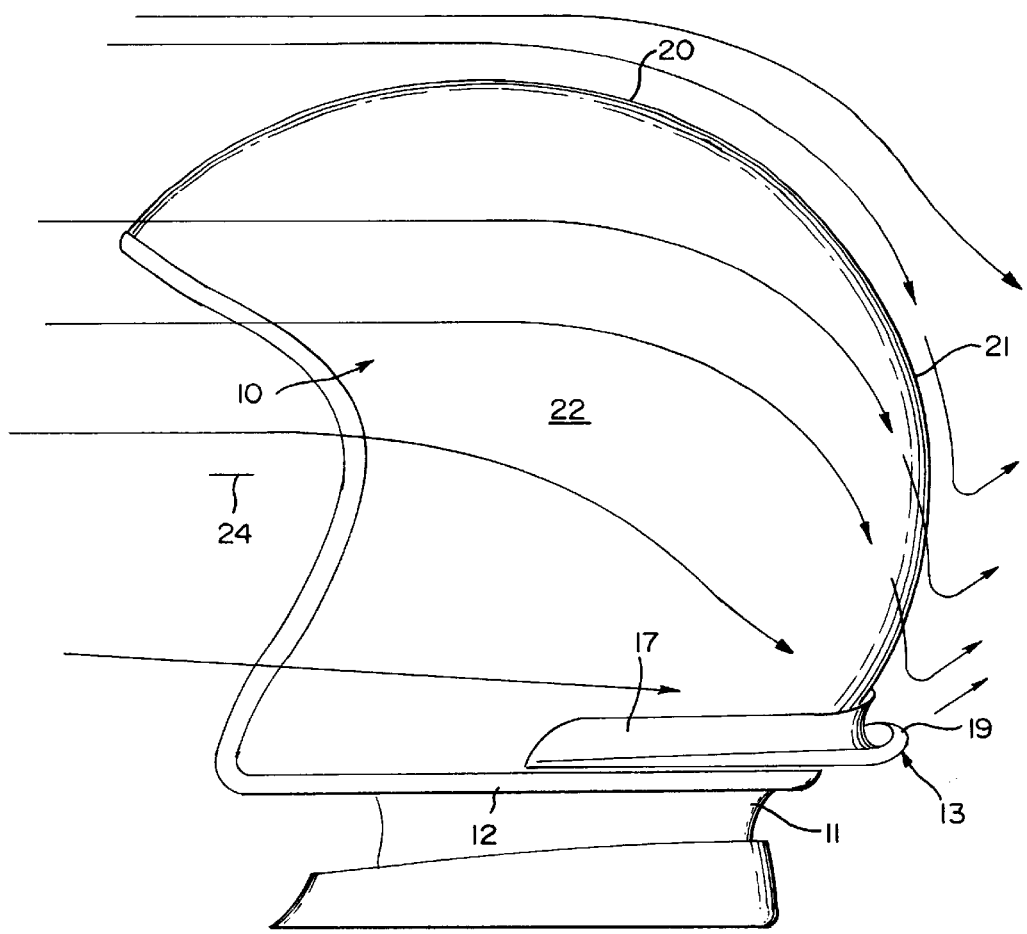
FIG. 1 is a perspective view of an embodiment of the stake assembly of the present invention.

Preferred embodiments of the invention will now be described with reference to the drawings. Like reference numerals or characters refer to like or corresponding parts throughout the drawings and description.

FIGS. 1–4 present embodiments of the stake assembly 20 of the present invention. Although a preferred embodiment of the invention is described herein as being used with an animal tether, it is intended to be understood that the invention may be used as a stake assembly for animals, tents, guy lines, boundary marking lines, and the like.

Referring to the example of FIG. 1, in a preferred embodiment, the stake assembly 20 may be generally described as including a spike 22, a flange 24, a receptacle 26, resilient fastening member 28.

The spike 22 has a first end 34 and a second end 36 which define a longitudinal axis 38 of the stake assembly 20. The flange 24 is connected at the second end 36 of the spike 22 and extends laterally therefrom. The flange 24 has a lower surface 40 facing or directed towards the first end 34 of the spike 22 and an upper surface 42. In the preferred embodiment, the upper surface 42 of the flange 24 forms the axial extremity of the second end 36 of the spike 22. The receptacle 26 extends axially into the flange 24 towards the first end 34 of the spike 22. The resilient fastening member 28 has a first end 48 connected in the receptacle 26 between the lower surface 40 of the flange 24 and the first end 34 of the spike 22, and a second end 50 extending out of the receptacle 26 beyond the upper surface 42 of the flange 24.

Figure 3:
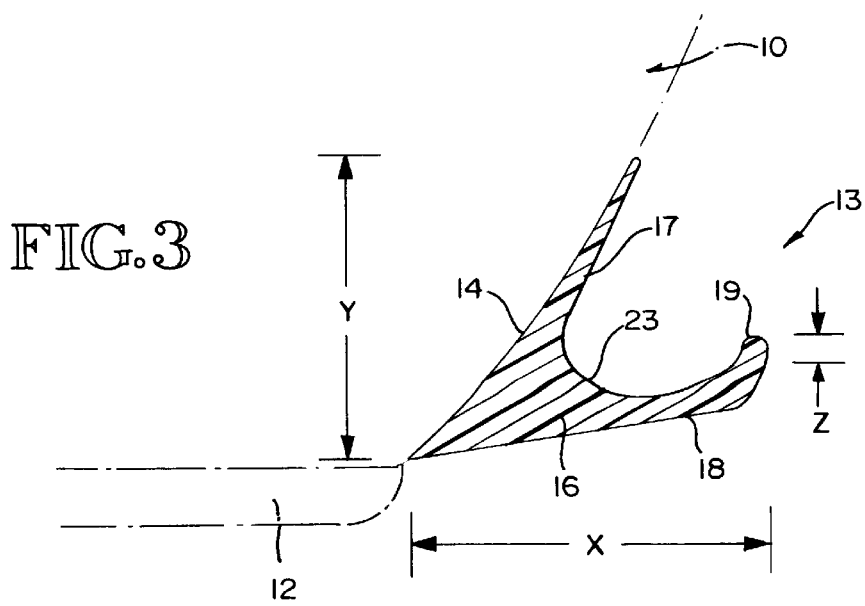
FIG. 3 is a perspective view of another embodiment of the stake assembly of the present invention.

Referring to the example of FIG. 3, the flange 24 may extend partially around the spike 22, and may extend laterally on one or more sides of the spike 22. In the example embodiment of FIG. 3, the flange 24 extends transversely on two diametrically opposing sides of the stake assembly 20. In the more preferred embodiments of the invention, referring to the example of FIGS. 1 and 2, the flange 24 circumscribes the stake assembly. The flange 24 may be integrally formed with the spike 22 or securely fastened to the spike 22, such as by chemical bonding, welding, riveting, mechanical threads, friction fit, and the like. The flange 24 and its connection to the spike 22 should have sufficient strength for driving the spike 22 into the ground and for prying the stake assembly 20 from the ground. The flange 24 also serves to limit the penetration of the stake assembly 20 into the ground and to thereby provide the desired lateral resilience and flexibility of the resilient fastening member 28, i.e., if more than about half the length of the resilient fastening member 28 is encased by the spike 22 or the ground, the resilience and flexibility is impaired. The flange 24 also prevents weeds and foliage from growing directly into the fastening member 28 and facilitates mowing of all grass and foliage around the stake assembly 20, i.e., a lawn mower can mow over the flange 24.

Referring to the example of FIG. 1, the preferred resilient fastening member 28 has insufficient resistance to both lateral and to axially compressive forces to injure a human being that walks into or falls onto the stake assembly 20. The resilient fastening member 28 resiliently or elastically stretches when subjected to tensile forces and returns to its original position and shape when the force is removed. Preferably, the resistance of the resilient fastening member 28 to tensile forces increases as the tensile forces stretch the resilient fastening member 28 in order to reduce the likelihood of injury to a pet, or other animal, that is tethered to the stake assembly 20 and runs or pulls against the stake assembly 20.

The resilient fastening member 28 may be any resilient or elastic member having the previously described properties. For example, the resilient fastening member 28 may be bungee cord or various types of mechanical springs. In the preferred embodiment, the resilient fastening member 28 is a coil spring, as exemplified in FIGS. 1–4. The coil spring is preferred, particularly when used with animals, because it may be selected to have sufficient lateral strength to stand up when the stake assembly 20 is placed in the ground and to hold a tether 52 connected to the second end 50 of the coil spring 28 above the surface of the ground. This prevents the tether 52 from sweeping the ground and debris onto the stake assembly 20 as the animal moves around the stake assembly 20. The upright positioning of the coil spring 28 also provides some initial resistance as the animal and tether 52 begin to pull laterally on the stake assembly 20, thereby providing an initial signal to the animal that it is approaching the limit of its tether. This both lengthens the life of the stake assembly 20 and reduces the risk of injury to the animal, as the animal will learn to recognize this initial signal and limit the forces it exerts on the stake assembly 20.

The upstanding or upright position of the coil spring 28 also gives a visual indication and warning of the presence of the stake assembly 20. The coil spring 28 may be spiral spring, i.e., a coil spring having spaces between the adjacent coils of the spring in order to reduce the likelihood of injury should something fall onto the upstanding spring 28. If such a spiral spring is used, the space between the adjacent coils of the spring should be small enough that the tether or leash 52 to be used with the stake assembly 20 cannot be caught in the spaces between the adjacent coils. The coil spring 28 is preferable to a bungee cord when the stake assembly 20 is used with animals because many animals can chew through the material of a bungee cord, whereas a metal coil spring is not susceptible to such damage.

Referring to the example of FIG. 1, in the prototype assembly 20 a connector 54, such as ring, snap ring, snap hook, or other fastening device, such as would be known to one skilled in the art in view of the disclosure contained herein, is connected to the second end 50 of the spring 28 to facilitate fastening of a tether 52 to the stake assembly 20. In the preferred stake assembly 20, the connector 54 is a ring. The inventors discovered that some types of tether clips 58, particularly snap-type clips, when connected directly to the second end 50 of the resilient fastening member 28, will bind on the relatively stiff second end 50 and disconnect from the second end 50 as the animal moves around the assembly 20, thereby disconnecting the tether 52 and animal from the stake assembly 20. The connector 54 acts as a universal joint between the relatively stiff or rigid second end 50 and the tether clip 58 in that it allows much greater freedom of motion of the clip 58 and thereby prevents the clip 58 from binding on and disconnecting from the second end 50 of the resilient fastening member 28 as the animal and tether 52 move around the stake assembly 20.

The spike 22 may be a rod of solid material, hollow conduit, pipe, tube, or the like. The first end 34 of the spike 22 should allow penetration of the earth as easily as possible. For example, if the spike 22 is a solid rod very little, if any shaping or sharpening of the first end 34 of the spike may be required. Preferably, as exemplified in FIGS. 1 and 2, the spike 22 is a hollow conduit, the first end 34 is closed, and tapered or pointed to facilitate penetration of the earth.

Preferably, the receptacle 26 is a recess in the flange 24 and second end 36 of the spike 22. The receptacle 26 should have sufficient depth to structurally support the preferred upright position of the fastening member 28 and to prevent exertion of lateral forces on the first end 48 of the fastening member 28, thereby preventing structural fatigue of the connection of the first end 48 in the receptacle 26. If the spike 22 is a solid rod, the receptacle 26 may be formed or excavated in the second end 36 of the spike. In the example embodiment of FIGS. 1 and 2, the spike 22 is a hollow conduit or pipe, and the receptacle 26 is simply the interior of the second end 36 of the pipe. A fastener 56, such as pin, rivet, bolt, or the like, extends transversely through the spike 22 at the desired distance from the flange 24 in order to securely fasten the fastening member 28 within the receptacle 26 and spike 22.

Figure 4:
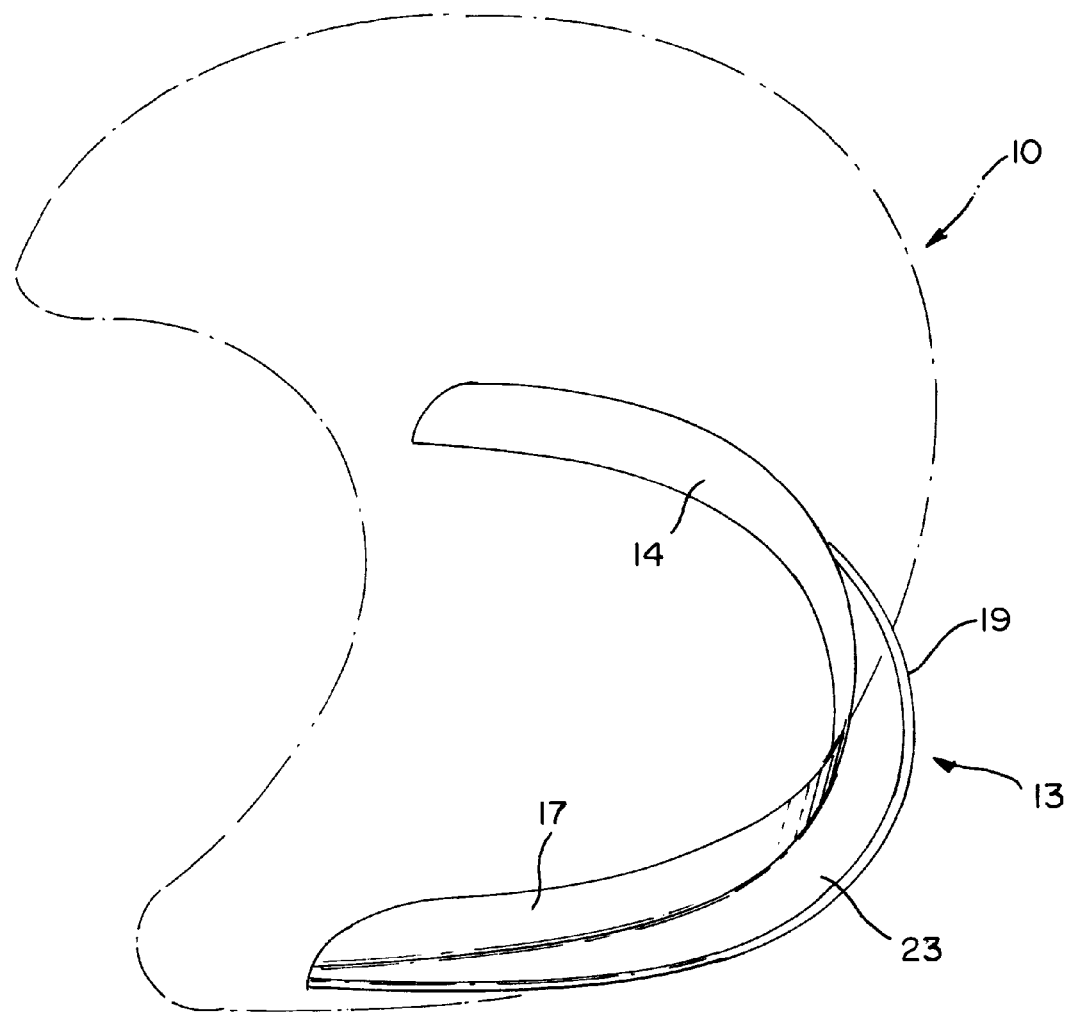
FIG. 4 is a cross-sectional view along line 4—4 of FIG. 3.
Figures 1, 2:
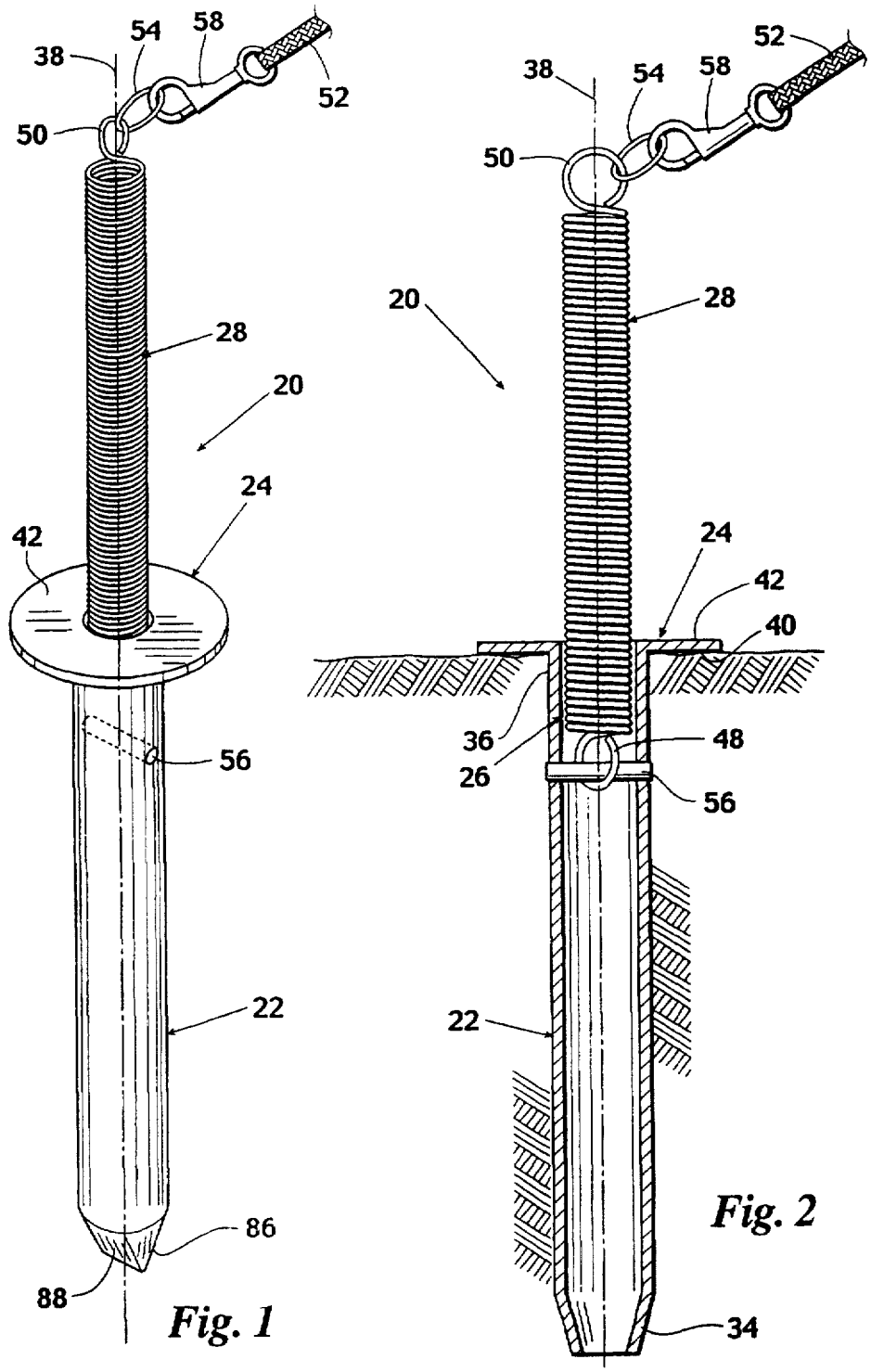
FIG. 2 is a cross-sectional view along line 2—2 of FIG. 1.
Figure 3:
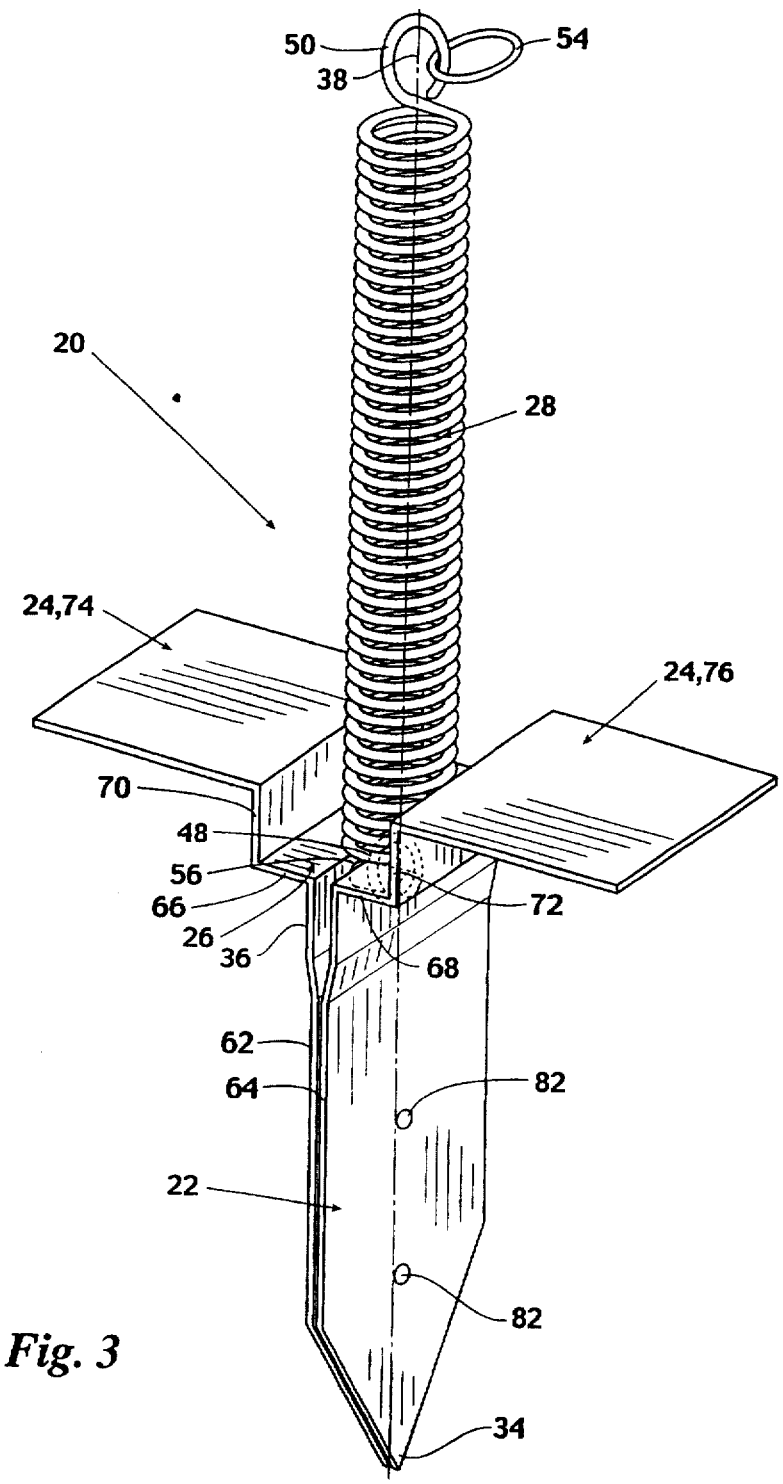
Figure 4:
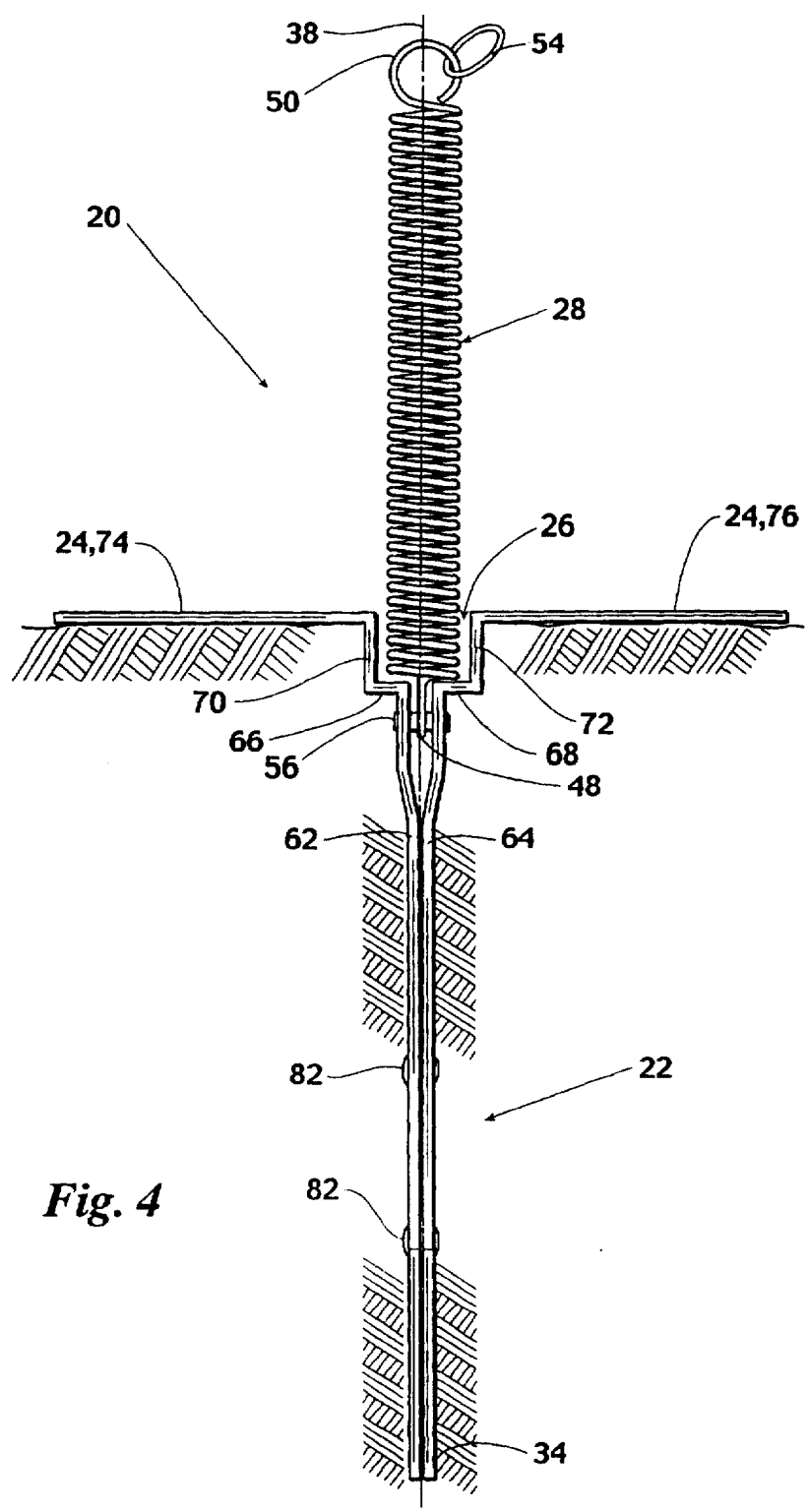

Referring to the example of FIGS. 3 and 4, in another embodiment of the stake assembly 20, the flange 24, receptacle 26, and spike 22 are made by bending or forming a strip or strips of metallic, PVC, plastic, or polymeric material. Referring to the example of FIG. 4, when viewed in axial cross-section, the spike 22 is formed of first and second sides 62, 64 of substantially flat strips of material. The receptacle 26 is created by bending the adjacent sides 62, 64 symmetrically in opposite directions to form the bottom surfaces 66, 68 of the receptacle 26; bending the adjacent sides 62, 64 symmetrically a second time towards each other to form the sides 70, 72 of the receptacle 26; and symmetrically bending the adjacent sides 62, 64 a third time in opposite directions to form diametrically opposing flanges 74, 76.

As would be known to one skilled in the art in view of the disclosure contained herein, if the stake assembly 20 of FIGS. 3 and 4 is made of metallic material it may be formed by bending; if made of PVC polymer, or plastics, it may be made by molding or extrusion, as appropriate to the material. As also would be known to one skilled in the art in view of the disclosure contained herein, the stake assembly of FIGS. 3 and 4 may be made of one continuous strip of material by adding a 180 degree bend at the first end 34 of the spike 22. The first and second adjacent sides 62, 64 may be secured together by brads 82. The brads 82 may be replaced by rivets, clips, bolts, screws, adhesives, welding, or other known methods of fastening. Preferably, fastener 56 is connected through the adjacent sides 62, 64 adjacent to the bottom surfaces 66, 68 of the receptacle 26 to secure the fastening member 28 in the receptacle 26. The fastener 56 may be a pin, bolt, screw, rivet, brad, or equivalent fastening device, as would be known to one skilled in the art in view of the disclosure contained herein. The first end 34 of the spike 22 created by the adjacent sides 62, 64 should be shaped or pointed to facilitate penetration of the earth by forming, molding, bending, cutting, grinding, or the like.

Referring to the example of FIG. 1, a prototype of the stake assembly 20 will now be described in greater detail to facilitate understanding of the invention. In the prototype, the spike 22 is a 9-inch length of metal pipe having a ¾-inch internal diameter. The first end 34 is closed by hammering, bending, pressing, or the like. Beveled edges 86, 88, are provided by cutting, grinding, bending, pressing, or the like. The second end 36 of the spike 22 includes external threads, and the flange 24 is threaded onto the second end 36 of the spike 22. The upper surface 42 of the flange 24 may be flush with the second end 36 of the spike 22, and the upper surface 42 of the flange 24 should define the axial extremity of the spike 22, as previously discussed. The prototype resilient fastening member 28 is an 8-inch long coil spring. The outside diameter of the spring 28 is approximately ¹⁄₁₆-inch smaller than the internal diameter of the receptacle 26 so that the spring 28 slides easily into the receptacle 26 and the receptacle gives lateral support to the spring 28. A metal pin 56 is securely fastened across the diameter of the pipe 22 two (2) inches below the flange 24 to securely fasten the spring 28 within the receptacle 26 formed by the pipe 22 and so that the spring 28 only extends about two (2) inches, or ¼ (one-quarter) of its length, into the receptacle 26. As previously mentioned, the spring 28 should extend sufficiently into the receptacle 26 that lateral forces exerted on the spring 28 by the tether 52 are transferred between the sides of the spring 28 and the receptacle 26, rather than exerted on the first end 48 of the spring. More than one-half (½) of the spring 28 should extend out of the receptacle 26 to prevent the receptacle 26 from stiffening the spring 28 and undesirably increasing its resistance to lateral forces. The lateral and axial resilience of the spring 28 also reduces the exertion of lateral forces on the stake assembly 20 and receptacle 26, thereby greatly reducing wear on the inside surfaces of the receptacle 26 and reducing the ability of such forces to wallow out the receptacle 26 and loosen the stake assembly 20 from its engagement in the ground. A ½-inch metal ring 54 is connected to the second end 50 of the spring 28 and the tether clip 58, which may be a snap hook, spring clip, or the like, is detachably connected to the ring 54. As previously discussed, the metal ring 54 acts as a universal joint, allowing the tether 52 and tether clip 58 greater freedom of motion (than a direct connection of the clip 58 to the second end 50) with respect to the stake assembly 20 as the animal moves around the stake assembly 20, and preventing the tether clip 58 from binding on the second end 50 and disconnecting itself from the stake assembly 20.

The prototype stake assembly 20 described in the previous paragraph is sized for average size dogs. The stake assembly 20 may be made in various sizes and various strengths of materials as necessary to accommodate the size and strength of an animal, the forces to be exerted on the stake assembly by an object to be restrained, and the forces to be encountered in imbedding the stake assembly in the various conditions of soil and rock encountered in the ground, as would be known to one of ordinary skill in the art in view of the disclosure contained herein.

While presently preferred embodiments of the invention have been described herein for the purpose of disclosure, numerous changes in the construction and arrangement of parts and/or the performance of steps will suggest themselves to those skilled in the art in view of the disclosure contained herein, which changes are encompassed within the spirit of this invention as defined by the following claims.

What is claimed is:

1. A stake assembly for placing in the ground so that the stake assembly has no rigid structure extending substantially above the surface of the ground, comprising
    a spike having a first end and a second end defining a longitudinal axis of the stake assembly;
    a flange connected at the second end of the spike and extending laterally therefrom, the flange having a lower surface facing the first end of the spike for covering the surface of the ground adjacent to the spike and limiting the penetration of the stake assembly into the ground and an upper surface forming the axial extremity of the second end of the spike so that the second end of the spike and the upper surface of the flange are adapted to be substantially flush with the surface of the ground when the stake assembly is placed in the ground;
    a receptacle extending axially into the flange towards the first end of the spike; and
    a resilient fastening member having a first end connected in the receptacle between the lower surface of the flange and the first end of the spike, and a second end extending out of the receptacle beyond the upper surface of the flange, the resilient fastening member being both axially and laterally resilient continuously between the first and second ends of the resilient fastening member so that the stake assembly has no rigid structure extending beyond the upper surface of the flange at any time.

2. Stake assembly of claim 1 in which the spike comprises:
    a hollow conduit, the second end of the conduit being open to provide the receptacle.

3. Stake assembly of claim 1:
    wherein the spike is made of a solid material; and
    the receptacle comprises a recess in the second end of the spike.

4. Stake assembly of claim 1:
    wherein the flange, receptacle, and spike are made of a strip of substantially rigid material.

5. Stake assembly of claim 1:
    wherein the flange extends partially around the second end of the spike.

6. Stake assembly of claim 1:
    wherein the flange circumscribes the second end of the spike.

7. Stake assembly of claim 1:
    wherein the flange is integrally formed with the spike.

8. Stake assembly of claim 1:
    wherein the second end of the spike is about flush with the upper surface of the flange.

9. Stake assembly of claim 1:
    wherein the resilient fastening member has insufficient resistance to lateral forces and to axially compressive forces to injure a human being.

10. Stake assembly of claim 1:
    wherein the resilient fastening member resiliently stretches when subjected to tensile forces and returns to its original shape and position when the tensile forces are removed.

11. Stake assembly of claim 1:
wherein the resistance of the resilient fastening member to axially tensile forces increases as the resilient fastening member is stretched by a tensile force.

12. Stake assembly of claim 1 in which the resilient member comprises:
a coil spring.

13. A stake assembly for placing in the ground so that the stake assembly has no rigid structure extending substantially above the surface of the ground, comprising
a spike having a first end and a second and defining a longitudinal axis of the stake assembly;
a flange connected at the second end of the spike and extending laterally therefrom, the flange having a lower surface facing the first end of the spike and an upper surface forming the axial extremity of the second end of the spike so that the second end of the spike and the upper surface of the flange are adapted to be substantially flush with the surface of the ground when the stake assembly is placed in the ground;
a receptacle extending axially into the flange towards the first end of the spike; and
a resilient fastening member having a first end connected in the receptacle between the lower surface of the flange and the first end of the spike, and a second end extending out of the receptacle beyond the upper surface of the flange, the resilient fastening member being both axially and laterally resilient continuously between the first and second ends of the resilient fastening member; and
wherein the flange, receptacle, and spike are made from at least two strips of relatively rigid material.

14. A stake assembly for placing in the ground so that the stake assembly has no rigid structure extending substantially above the surface of the ground, comprising
a spike having a first end and a second and defining a longitudinal axis of the stake assembly;
a flange connected at the second end of the spike and extending laterally therefrom, the flange having a lower surface facing the first end of the spike and an upper surface forming the axial extremity of the second end of the spike so that the second end of the spike and the upper surface of the flange are adapted to be substantially flush with the surface of the ground when the stake assembly is placed in the ground;
a receptacle extending axially into the flange towards the first end of the spike; and
a resilient fastening member having a first end connected in the receptacle between the lower surface of the flange and the first end of the spike, and a second end extending out of the receptacle beyond the upper surface of the flange, the resilient fastening member being both axially and laterally resilient continuously between the first and second ends of the resilient fastening member; and
wherein the flange extends laterally on two diametrically opposing sides of the stake assembly.

15. A stake assembly for placing in the ground so that the stake assembly has no rigid structure protruding obstructively above the surface of the ground and for resiliently tethering an object to the ground, comprising
a spike having a first end and a second end defining a longitudinal axis of the stake assembly;
a flange extending laterally from the second end of the spike, the flange having a lower surface facing the first end of the spike for covering the surface of the ground adjacent to the spike and limiting the penetration of the stake assembly into the ground and an upper surface, the upper surface being about flush with the second end of the spike so that the second end of the spike and the flange are adapted to be substantially flush with the surface of the ground when the stake assembly is driven into the ground, the flange providing a structure for driving the spike into the ground and prying the spike from the ground;
a receptacle recessed axially in the second end of the spike; and
a coil spring having a first end extending into the receptacle beyond the lower surface of the flange and a second end extending about axially away from the receptacle and extending out of the receptacle beyond the upper surface of the flange so that the stake assembly has no rigid structure extending beyond the upper surface of the flange at any time.

* * * * *

UNITED STATES PATENT AND TRADEMARK OFFICE
CERTIFICATE OF CORRECTION

PATENT NO. : 5,992,435
DATED : November 30, 1999
INVENTOR(S) : Gary R. Kindell and Sharon D. Kindell It is certified that error appears in the above-identified patent and that said Letters Patent is hereby corrected as shown below:

Title page
Showing the illustrative figure should be deleted to be replaced with the attached title page.

Items [73] and [57] should read as follows:
[73] Assignee: delete "BS&B Saftey Systems,Inc., Tulsa, Okla."
[57] Abstract: line 2: add --assembly-- after "of the stake".

In the Drawings, sheets 1-3, consisting of Figs. 1, 2, 2A, 3 and 4, should be deleted to be replaced with Figs. 1, 2, 3, and 4, as shown on the attached pages.

Column 2,
Line 45: add --and-- between "26," and "resilient".

Signed and Sealed this

Twenty-eighth Day of August, 2001

*Attest:*

*Attesting Officer*

NICHOLAS P. GODICI
*Acting Director of the United States Patent and Trademark Office*

United States Patent [19]
Kindell et al.

[11] Patent Number: 5,992,435
[45] Date of Patent: Nov. 30, 1999

[54] STAKE ASSEMBLY

[75] Inventors: Gary R. Kindell; Sharon D. Kindell, both of Ripley, Okla.

[73] Assignee: BS&B Safety Systems, Inc., Tulsa, Okla.

[21] Appl. No.: 08/957,720

[22] Filed: Oct. 24, 1997

[51] Int. Cl.$^6$ .............................. E04H 15/62; A01K 1/04
[52] U.S. Cl. .......................... 135/118; 52/155; 119/781; 119/791; 135/120.4
[58] Field of Search .......................... 135/118, 120.4; 52/154, 155, 156, 165; 119/789, 786, 781, 791; 43/15

[56] References Cited

U.S. PATENT DOCUMENTS

| | | |
|---|---|---|
| 289,033 | 11/1883 | Shattuck. |
| 302,374 | 7/1884 | Baker. |
| 429,111 | 6/1890 | Bailey. |
| 695,427 | 3/1902 | Davis. |
| 1,579,294 | 4/1926 | Fisk ............................ 119/786 X |
| 1,700,224 | 1/1929 | Hendersen ........................ 119/786 |
| 1,730,176 | 10/1929 | Thrasher et al. |
| 2,507,383 | 5/1950 | Schiel et al. .................. 119/781 X |
| 2,713,327 | 7/1955 | West ............................ 119/789 X |
| 2,790,419 | 4/1957 | Sullivan. |
| 2,952,024 | 9/1960 | Bartolucci ..................... 135/120.4 X |
| 3,189,004 | 6/1965 | Sinclair. |
| 3,279,133 | 10/1966 | Korte ............................ 52/155 X |
| 3,658,037 | 4/1972 | Hunter ......................... 119/781 X |
| 3,952,878 | 4/1976 | Gorham ........................... 52/155 X |
| 4,471,553 | 9/1984 | Copeland ............................ 43/15 |
| 4,750,508 | 6/1988 | Tatoian ........................ 135/118 X |
| 5,542,679 | 8/1996 | Caso ........................... 108/150 X |

*Primary Examiner*—Carl D. Friedman
*Assistant Examiner*—Winnie S. Yip
*Attorney, Agent, or Firm*—Gardere & Wynne, L.L.P.; Lawrence R. Watson

[57] ABSTRACT

A stake assembly includes a spike having a first end and a second end defining a longitudinal axis of the stake. A flange is connected at the second end of the spike and extends laterally therefrom, the upper surface of the flange forming the axially and extremity of the second end of the spike. A receptacle is recessed axially into the flange and second end of the spike. A resilient fastening member, such as a coiled spring, has a first end connected in the receptacle between the flange and the first end of the spike and a second end extending out of the receptacle beyond the upper surface of the flange. A tether or leash may be fastened to the second end of the resilient fastening member.

15 Claims, 3 Drawing Sheets

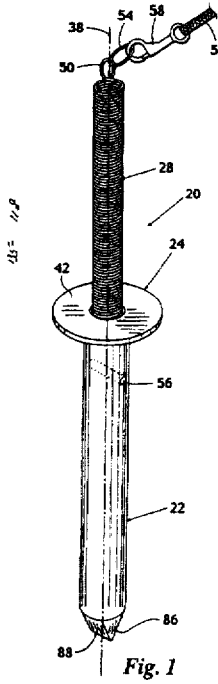

Fig. 1